United States Patent Office 2,798,854
Patented July 9, 1957

2,798,854

INFRARED STIMULABLE ZINC SULFIDE PHOSPHOR

Herman C. Froelich, Cleveland Heights, Ohio, assignor to General Electric Company, a corporation of New York No Drawing. Application April 30, 1956,
Serial No. 581,370

7 Claims. (Cl. 252—301.6)

My invention relates to luminescent materials or phosphors, and more particularly to copper-activated zinc sulfide phosphors and methods of preparation thereof.

The present application is a continuation-in-part of my co-pending application Serial No. 307,178, filed August 29, 1952, now abandoned, and assigned to the same assignee as the instant application.

It is an object of my invention to provide zinc sulfide copper-activated phosphors which are stimulable by infrared radiation after excitation by ultraviolet radiation.

It is another object of my invention to provide zinc sulfide copper-activated phosphors which are stimulable by infrared radiation to emit in the yellow-orange spectrum.

It is a further object of my invention to provide infrared stimulable zinc sulfide copper-activated phosphors which exhibit long storage ability and stability and particularly moisture stability.

In accordance with my Letters Patent No. 2,660,566, issued November 24, 1953, I have found that pure, unfluxed, copper-activated zinc sulfide phosphors when prepared in an atmosphere of hydrogen sulfide exhibit infrared stimulability and long storage ability after excitation by long ultraviolet radiation. I have found further that the infrared sensitivity of such phosphors is lost when they are prepared in such atmosphere with additional aluminum to facilitate the solid solution of copper sulfide in the zinc sulfide base, as disclosed in my Letters Patent No. 2,743,237, issued April 24, 1956.

I have found, however, in accordance with the present invention, that certain trivalent elements in group III of the periodic table actually enhance the infrared sensitivity of these phosphors.

Prior to the disclosure in my Letters Patent No. 2,660,566 it was known that pure, unfluxed, copper-activated zinc sulfide phosphors were unresponsive to ultraviolet radiation or only weakly responsive. It was also known that some previous excitation is essential to produce appreciable infrared stimulability. It was further known that such unresponsiveness could be cured by firing zinc sulfide copper-activated phosphor in the presence of fluxes, such as sodium chloride, and such manufacturing methods rendered the phosphor highly responsive to ultraviolet excitation. It was for some time the accepted theory that these so-called fluxes performed as true fluxes only, in promoting crystal formation during firing, and that the flux materials were entirely removed upon subsequent washing of the phosphor.

It has recently been discovered and experimentally demonstrated in a number of published papers that, due to the presence of chloride fluxes in the preparation of singly activated zinc sulfide-copper phosphors, these phosphors all contained small amounts of constitutional chloride in their crystal lattices. It has been conclusively established that the presence of these small amounts of constitutional chloride is necessary in order for these phosphors to exhibit their particular properties. In other words, it is well recognized that constitutional chloride is incorporated in the crystal lattice of the matrix when the phosphor is fired in the presence of a flux, which chloride is never removed regardless of subsequent washing and which incorporated chloride is essential for the phosphor to exhibit appreciable luminescent properties.

It has also been established that the upper limits of solid solubility of copper in the zinc sulfide matrix is approximately 0.01% copper by weight of zinc sulfide even when the phosphor is fired in the presence of the aforementioned fluxes. Firing the matrix ingredients with activator compounds and known fluxes does not raise this upper limit of solubility. As pointed out by Leverenz in his book "Luminescence of Solids," published in 1950 by John Wiley & Sons, on page 203, "The cathodoluminescent efficiency of the Cu band increases up to 0.01 weight percent Cu but has a lower efficiency than the original (Zn) band (again, increasing the activator proportion above the optimum gives increasingly dark products which strongly absorb their own emissions)." It is well established that copper in excess of 0.01% will not go into solid solution in the zinc sulfide matrix and any excess over this amount remains as an impurity in the phosphor powder rather than entering the crystal lattice as an activator. The effect of this impurity is to physically darken the phosphor under daylight observation. While my invention relates to infrared stimulability rather than the cathodoluminescence to which Leverenz refers, it is well known that black-appearing phosphors will absorb their own emission regardless of how said emission is produced. The effective range of copper activator concentrations prior to my invention has therefore been established at between 0.001 and 0.01 percent copper by weight of zinc sulfide.

It has still more recently been shown, as indicated in my U. S. Patent No. 2,743,237, that aluminum appeared to render more copper soluble in the base material, i. e., it allows a higher percentage of copper activator to be taken into solid solution in the zinc sulfide crystals to produce a new emission band.

It has thus been shown that, in order for copper to function as an activator, roughly equivalent amounts of either monovalent, negative halide ions, incorporated by the firing in the presence of fluxes such as sodium chloride, or trivalent, positive ions, such as aluminum, must be present in the phosphor. In either case identical emission bands of identical intensity will be produced. However, as previously stated, the infrared sensitivity of the phosphor is lost when aluminum is added.

In accordance with my present invention, I have discovered that bright yellow to orange emission can be produced under infrared stimulation by the addition of scandium, neodymium, praseodymium or cerium to flux-free, singly activated zinc sulfide ZnS.Cu phosphors which have been fired, in the absence of fluxes, in an atmosphere of hydrogen sulfide. Phosphors of the singly activated type disclosed herein were prepared in the total absence of any fluxes. The combination of one or more of the additive materials, high copper activator concentrations, hydrogen sulfide firing and the total absence of fluxes as herein disclosed resulted in a new phosphor with entirely different emission characteristics.

That the phosphors of my discovery are truly singly activated phosphors is borne out by the fact that all of the emission produced is traceable solely to the copper activator and no emission bands are produced by the additive materials as would be the case were any of these additives functioning as activators of the phosphor.

The brightness of the stimulated light from phosphors with copper plus cerium was several times the brightness of phosphors with copper activator alone, while with scandium the brightness was at least ten times greater than that of copper alone, and with neodymium and praseodymium the brightness was intermediate that obtained with scandium and with cerium.

With respect to existing infrared stimulable phosphors, such as disclosed in Fonda Patent No. 2,447,322, assigned to the same assignee as the instant application, a double activation of the zinc sulfide phosphor by copper and lead gives a blue-green emission under infrared radiation. This is believed due to the use of copper and lead as activators. In some phosphors a red emission is achieved using lead and manganese as activators, which emission is well known to be attributable to manganese activation. In another, an orange luminescence is obtained which is directly attributable to the combination of copper and manganese as activators. In still another phosphor a yellow luminescence is achieved which is attributable to the incorporation of cadmium in the matrix resulting in a zinc cadmium sulfide phosphor activated with copper and lead. It is noted that the incorporation of lanthanum with copper in the zinc sulfide phosphor of the type disclosed by the Fonda patent gives, upon excitation with ultraviolet and stimulation with infrared, a yellow luminescence. However, the addition of lanthanum to a pure, unfluxed zinc sulfide phosphor, which phosphor contains a much higher proportion of copper activator in accordance with my invention, completely destroys the infrared stimulability of the phosphor. As previously mentioned, phosphors such as disclosed in the Fonda patent require firing in the presence of fluxes in order to incorporate the negative halide ion in the matrix crystal which is essential to luminescent response. Also, such prior phosphors were limited in the solid solubility of the copper activator in the zinc sulfide matrix, such solubility being on the order of 0.01% copper by weight of the zinc sulfide. On the other hand, a phosphor prepared in accordance with my invention and incorporating the aforementioned additive materials gives a much higher solubility of the copper activator. This has one advantage, among others, of shifting the emission band.

The phosphors of my invention also possess a quality, the lack of which has been a serious drawback in the practical utilization of previously known infrared stimulable phosphors. While the shelf life or storage-ability of prior art phosphors has been improved somewhat, the previously known yellow-orange emitting infrared-stimulable phosphors lacked moisture stability. In this connection, it has been appreciated that yellow-orange emission is preferable to blue-green emission in certain infrared detecting and indicating devices. Other infrared stimulable phosphors have lost their brightness completely after exposure to air for one day due to their well-known instability in the presence of moisture. The phosphors disclosed herein have retained their brightness under infrared radiation after immersion in water continuously for 10 days. Samples of my phosphors have been stored in water for 10 days without noticeable effect on the brightnes of their emission.

The phosphors of my invention may be prepared by reacting zinc sulfide with salts of copper and the additive element, the materials being fired flux-free at a temperature of about 1000–1200° C., preferably about 1100° C., in an atmosphere of hydrogen sulfide. The phosphors with scandium as the additive metal were almost equally bright whether prepared in pure hydrogen sulfide or with the addition of some water vapor. The latter has a slight effect in shifting the stimulated spectrum toward shorter wavelengths, for example from orange to yellow-orange, or from yellow to green-gellow.

Additive elements other than these specified above in general either have no substantial effect on the infrared stimulability of the phosphor or they destroy the stimulability. For example, of the elements in groups I and II of the periodic table, additives such as lithium, calcium or cadmium caused neither appreciable harm nor benefit, while the other elements in those groups caused a reduction in brightness. Under all forms of excitation, however, the emission color was orange and not green as with the usual fluxes. In group III of the periodic table boron, gallium, indium and lanthanum destroyed the stimulability, while thallium and yttrium produced stimulation of yellower color and slightly higher intensity than copper alone. As stated hereinbefore, cerium, praseodymium, neodymium and, especially scandium, were outstanding. Of the elements in group IV, lead and germanium plus copper gave about the same color and brightness as copper alone; tin, like thallium, gave slightly yellower and brighter stimulation, while silicon and titanium destroyed the stimulability. Of the elements in group V, phosphorus destroyed the stimulability, arsenic and antimony impaired it somewhat, and bismuth enhanced it somewhat causing also a shift toward yellow and a quicker exhaustion. Weak responses were also obtained with the rare earth elements samarium, dysprosium, erbium and europium. A few typical examples of phosphors prepared in accordance with my invention are as follows:

*Example I*

10 grams of pure zinc sulfide were mixed with a solution of copper and cerium nitrates in amounts to give 0.05% copper and 0.22% cerium in the phosphor. This corresponds to a mole ratio Cu:Ce=1:2. After drying and sieving, the powder was fired at 1100° C. in an atmosphere of pure hydrogen sulfide for one-half hour. After cooling in this atmosphere, the powder was washed with a solution of sodium cyanide, dried, and screened through a 200 mesh sieve. When excited by 3650 A. ultraviolet, it fluoresced weak yellow-green, showed a weak green phosphorescence, and a strong yellow emission when stimulated with infrared.

*Example II*

10 grams of pure zinc sulfide were slurried with a solution of copper nitrate and scandium sulfate in amounts to give .05% copper and .013% scandium in the phosphor. This corresponds to a mole ratio of Cu:Sc=1:0.37. After drying and sieving, the powder was fired at 1100° C. in an atmosphere of pure hydrogen sulfide for one-half hour. After cooling in this atmosphere the powder was washed with a solution of sodium cyanide, dried, and screened through a 200 mesh sieve. When excited by 3650 A. ultraviolet, it fluoresced yellow, showed a fairly strong yellow phosphorescence, and a very strong yellow emission when stimulated with infrared.

*Example III*

The composition of Example II was duplicated in all details except that the firing atmosphere contained about 3% of additional water vapor. This resulted in all fluorescent colors being green-yellow rather than yellow.

*Example IV*

10 grams of pure zinc sulfide were slurried with a solution of copper nitrate and scandium sulfate in amounts to give .05% copper and .05% scandium in the phosphor. This corresponds to a mole ratio of Cu:Sc=1:1.4. After firing as in Example I, the material fluoresced bright orange and gave a very bright orange light when stimulated with infrared.

In the phosphors with cerium as additive the stored energy is released in the form of a fairly short bright flash followed by a long tail of much lower intensity. In the phosphors with scandium, the stored energy is released at a much slower rate and at continuing relatively high intensity.

The infrared stimulation becomes weak when the phosphors contain less than about .02% added copper by weight of the ZnS. The brightest yellow-orange stimulation was attained with about .05% added copper and about .01% to .05% scandium by weight of the ZnS. An increase of the scandium content caused the luminescence to become more orange. As the copper content was increased to 0.10% and 0.15%, the stimulability became somewhat weaker. However, with 0.3% copper it became strong again and of deeper orange color. With 0.6% copper the brightness declined appreciably. Thus, the best compositions were bade with about 0.05% and with 0.3% added copper, and with amounts of scandium equal to about 0.3 to 1.5 moles of copper equivalent. The phosphors with 0.3% added Cu may be prepared exactly in accordance with Examples II to IV given above.

With additives of neodymium or praseodymium, particularly bright infrared stimulation was obtained with about 0.05% added copper and with 0.05% to 0.2% praseodymium or neodymium. The color of the stimulated light was orange as in the case of scandium.

In general, I have found that effective results are obtained when the copper is present in an amount within the range of 0.025% to 0.5% by weight of the ZnS, with optimum brightnesses when the copper content is 0.05% or 0.3%. The additive metals scandium, neodymium, praseodymium and cerium may be employed in molar proportions, relative to the copper, within the range of 1:0.2 to 1:3. The optimum ranges, in molar proportions, are as follows:

$$Cu:Sc = 1:0.3 \text{ to } 1:1.5$$
$$Cu:Nd = 1:0.4 \text{ to } 1:1.8$$
$$Cu:Pr = 1:0.4 \text{ to } 1:1.8$$
$$Cu:Ce = 1:0.4 \text{ to } 1:2.$$

What I claim as new and desire to secure by Letters Patent of the United States is:

1. An infrared stimulable, flux-free phosphor of zinc sulfide fired in an atmosphere of hydrogen sulfide and activated by copper within the range of 0.025% to 0.5% by weight of the zinc sulfide, and an additive metal of the group consisting of scandium, neodymium, praseodymium and cerium in an amount within the range of 0.2 to 3 moles of copper equivalent to give yellow-orange emission.

2. An infrared stimulable, flux-free phosphor of zinc sulfide fired in a hydrogen sulfide atmosphere and activated by about 0.05% by weight of copper, and an additive metal of the group consisting of scandium, neodymium, praseodymium and cerium in an amount within the range of 0.2 to 3 moles of copper equivalent to give yellow-orange emission.

3. An infrared stimulable, flux-free phosphor of zinc sulfide fired in a hydrogen sulfide atmosphere and activated by about 0.3% by weight of copper, and an additive metal of the group consisting of scandium, neodymium, praseodymium and cerium in an amount within the range of 0.2 to 3 moles of copper equivalent to give yellow-orange emission.

4. An infrared stimulable, flux-free phosphor of zinc sulfide fired in a hydrogen sulfide atmosphere and activated by copper within the range of 0.025 to 0.5 percent by weight of the zinc sulfide, and scandium in an amount in the range of about 0.3 to 1.5 moles of copper equivalent to give yellow-orange emission.

5. An infrared stimulable, flux-free phosphor of zinc sulfide fired in a hydrogen sulfide atmosphere and activated by copper within the range of 0.025% to 0.5% by weight of the zinc sulfide, and neodymium in an amount in the range of about 0.4 to 1.8 moles of copper equivalent to give yellow-orange emission.

6. An infrared stimulable, flux-free phosphor of zinc sulfide fired in an atmosphere of hydrogen sulfide and activated by copper within the range of 0.025% to 0.5% by weight of the zinc sulfide, and praseodymium in an amount in the range of about 0.4 to 1.8 moles of copper equivalent to give yellow-orange emission.

7. An infrared stimulable, flux-free phosphor of zinc sulfide fired in a hydrogen sulfide atmosphere and activated by copper within the range of 0.025% to 0.5% by weight of the zinc sulfide, and cerium in an amount in the range of about 0.4 to 2 moles of copper equivalent to give yellow-orange emission.

References Cited in the file of this patent

UNITED STATES PATENTS

| | | |
|---|---|---|
| 2,447,322 | Fonda | Aug. 17, 1948 |
| 2,470,451 | Wood | May 17, 1949 |
| 2,522,074 | Urbach | Sept. 12, 1950 |
| 2,623,859 | Kroger | Dec. 30, 1952 |